(12) United States Patent
Inoue

(10) Patent No.: US 11,407,879 B2
(45) Date of Patent: Aug. 9, 2022

(54) ACRYLIC RUBBER COMPOSITION

(71) Applicant: NOK CORPORATION, Tokyo (JP)

(72) Inventor: Kotaro Inoue, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 27 days.

(21) Appl. No.: 16/634,852

(22) PCT Filed: Aug. 21, 2018

(86) PCT No.: PCT/JP2018/030827
§ 371 (c)(1),
(2) Date: Jan. 28, 2020

(87) PCT Pub. No.: WO2019/044592
PCT Pub. Date: Mar. 7, 2019

(65) Prior Publication Data
US 2020/0199327 A1    Jun. 25, 2020

(30) Foreign Application Priority Data

Aug. 31, 2017 (JP) .............................. JP2017-166912

(51) Int. Cl.
| | |
|---|---|
| *C08L 33/08* | (2006.01) |
| *C08K 3/04* | (2006.01) |
| *C08K 3/36* | (2006.01) |
| *C09K 3/10* | (2006.01) |
| *F16J 15/3284* | (2016.01) |

(52) U.S. Cl.
CPC .............. *C08K 3/042* (2017.05); *C08K 3/36* (2013.01); *C09K 3/10* (2013.01); *F16J 15/3284* (2013.01)

(58) Field of Classification Search
CPC ........ C09J 133/16; C08L 33/08; C08K 3/042; C08K 3/36; C08K 3/04; C09K 3/10; F16J 15/32; F16J 15/3284; F16D 25/12
USPC ....................................................... 524/560
See application file for complete search history.

(56) References Cited

U.S. PATENT DOCUMENTS

| | | | | |
|---|---|---|---|---|
| 6,699,944 B1 * | 3/2004 | Fujita | ..................... | C08F 8/00 525/209 |
| 2006/0167159 A1 * | 7/2006 | Kubota | ..................... | C08K 3/36 524/439 |
| 2009/0283972 A1 | 11/2009 | Nishimura et al. | | |
| 2012/0091624 A1 | 4/2012 | Sato et al. | | |
| 2015/0035235 A1 | 2/2015 | Tsuda | | |
| 2017/0051123 A1 | 2/2017 | Kawabayashi et al. | | |
| 2017/0190868 A1 * | 7/2017 | Furukawa | .............. | F16J 15/102 |

FOREIGN PATENT DOCUMENTS

| | | |
|---|---|---|
| CN | 102083906 A | 4/2011 |
| CN | 104650516 A | 5/2015 |
| CN | 1064595552 A | 2/2017 |
| EP | 3150664 A1 | 4/2017 |
| JP | 7-33943 | 2/1995 |
| JP | 09-194670 | 7/1997 |
| JP | H11-302491 A | 11/1999 |
| JP | 3382676 | 12/2002 |
| JP | 2008-51125 A | 3/2008 |
| JP | 2010-13532 A | 1/2010 |
| JP | 2015-30819 A | 2/2015 |
| JP | 2017-39822 A | 2/2017 |
| JP | 2018-016766 A | 2/2018 |
| WO | WO 2011/010615 A1 | 1/2011 |

OTHER PUBLICATIONS

English Machine Translation of JP 338676. (Year: 2002).*
"Noxtite ACM Polymers Selection Guide", Available at https://unimatec-chemicals.com/wp-content/uploads/unimatec-ACM.pdf, Retrieved on Aug. 25, 2021. (Year: 2021).*
Handbook of Synthetic Rubber Industry, Lanzhou Chemical Industry, Dahua Liu, Chemical Industry Press, pp. 1072-1073, Table 15-5-1.
Notification of Translation of the International Preliminary Report on Patentability of corresponding PCT application No. PCT/JP2018/030827.
Written Opinion of the International Searching Authority of corresponding PCT application No. PCT/JP2018/030827.
International Search Report and Written Opinion from corresponding PCT application No. PCT/JP2018/030827 dated Oct. 30, 2018 (4 pgs).

* cited by examiner

*Primary Examiner* — Hannah J Pak

(57) ABSTRACT

An acrylic rubber composition comprising 5 to 12.5 parts by weight of silica and 5 to 15 parts by weight of graphite as fillers, based on 100 parts by weight of ultracold-resistant acrylic rubber having a glass transition point Tg of −42° C. or less. Due to the use of ultracold-resistant acrylic rubber, the use environment temperature, i.e., −30 to +150° C., is satisfied. In addition, the respective use of specific amounts of silica and graphite as fillers allows the formation of bonded piston seals that have roll processability and adhesion equivalent to or higher than those of the existing seals, and that satisfy compression set characteristics.

8 Claims, No Drawings

ACRYLIC RUBBER COMPOSITION

RELATED APPLICATION

This application is a 35 U.S.C. § 371 national phase filing of International Patent Application No. PCT/JP2018/030827, filed Aug. 21, 2018, which claims priority under 35 U.S.C. § 119 to Japanese Patent Application No. 2017-166912, filed Aug. 31, 2017, the entire disclosure of which is hereby expressly incorporated by reference.

TECHNICAL FIELD

The present invention relates to an acrylic rubber composition. More particularly, the present invention relates to an acrylic rubber composition that is effectively used, for example, for vulcanization molding of bonded piston seals.

BACKGROUND ART

Sealing materials made of acrylic rubber have conventionally been used as bonded piston seals for use in transmissions, due to their use environment temperature (i.e., about −30 to +150° C.).

In recent years, for sales promotion in cold districts, there have been demands for the development of sealing materials that do not break even at −40° C. However, the simple use of acrylic rubber having a low glass transition point Tg caused problems in roll processability, adhesion, etc.

PRIOR ART DOCUMENT

Patent Document

Patent Document 1: JP-B-3382676

OUTLINE OF THE INVENTION

Problem to be Solved by the Invention

An object of the present invention is to provide an acrylic rubber composition that satisfies the product function of bonded piston seals, and that can sufficiently withstand the use in a low temperature environment.

Means for Solving the Problem

The above object of the present invention can be achieved by an acrylic rubber composition comprising 5 to 12.5 parts by weight of silica and 5 to 15 parts by weight of graphite as fillers, based on 100 parts by weight of ultracold-resistant acrylic rubber having a glass transition point Tg of −42° C. or lower.

Effect of the Invention

Due to the use of ultracold-resistant acrylic rubber, the use environment temperature, i.e., −30 to +150° C., is satisfied. In addition, the respective use of specific amounts of silica and graphite as fillers allows the formation of bonded piston seals that have roll processability and adhesion equivalent to or higher than those of the existing seals, and that satisfy compression set characteristics.

Further, because of the high roll processability, the acrylic rubber composition is characterized in that its production is easier than conventional ones.

EMBODIMENTS FOR CARRYING OUT THE INVENTION

The acrylic rubber used herein is ultracold-resistant acrylic rubber having a glass transition point Tg of −42° C. or lower, and preferably halogen-containing acrylic rubber that satisfies this grade. In practice, a commercial product, such as NOXTITE PA-404N (produced by UNIMATEC Co., Ltd), can be used as it is.

NOXTITE PA-404N is described in Patent Document 1, and comprises at least one of alkyl acrylate, alkoxyalkyl acrylate, alkylthioalkyl acrylate, cyanoalkyl acrylate, etc., as a main component (about 60 to 99.8 wt. %). A copolymer obtained by copolymerizing this main component with about 0.1 to 10 wt. %, preferably about 1 to 5 wt. %, of vinyl chloroacetate, allyl chloroacetate, or an addition reaction product of a glycidyl compound (e.g., glycidyl acrylate, glycidyl methacrylate, or allyl glycidyl ester) with monochloroacetic acid, is used. In this copolymer, other vinyl compounds can be copolymerized within a range of 30 wt. % or less.

Moreover, usable examples of the halogen-containing acrylic rubber include halogen and carboxyl group-containing acrylic rubber, e.g., in the above-mentioned halogen-containing acrylic rubber those obtained by copolymerizing with about 0.1 to 10 wt. %, preferably about 1 to 5 wt. %, of unsaturated monocarboxylic acid, such as acrylic acid or methacrylic acid, or an unsaturated dicarboxylic acid monoester, such as mono-lower alkyl of maleic acid or fumaric acid.

As the silica, one with a general grade is used. Specific examples thereof include dry process silica produced by thermal decomposition of halogenated silicic acid or an organic silicon compound, or by heating and reducing silica sand, followed by air oxidation of the evaporated SiO; wet process silica produced, for example, by thermal decomposition of sodium silicate; and the like. The specific surface area thereof is about 30 to 300 $m^2/g$. In practice, commercial products currently marketed for rubber industrial use, such as AEROSIL 200 (produced by NIPPON AEROSIL Co., Ltd), Nipsil ER #100 and E74P (produced by Tosoh Silica Corporation), and ULTRASIL 360 (produced by Evonik Degussa), can be used as they are.

Also as the graphite, one with a general grade is used. Specific usable examples include natural graphite or artificial graphite, preferably natural graphite, having a particle diameter of about 0.5 to 250 µm, preferably about 1.5 to 30 µm.

Silica is used at a ratio of 5 to 12.5 parts by weight, and graphite is used at a ratio of 5 to 15 parts by weight, based on 100 parts by weight of acrylic rubber. If the ratio of silica used is less than this range, adhesion is inferior. If the ratio of silica used is greater than this range, compression set deteriorates. Moreover, if the ratio of graphite used is less than this range, roll processability and adhesion are inferior. If the ratio of graphite used is greater than this range, compression set deteriorates.

The composition is prepared by adding a filler (e.g., silica, graphite, or carbon black), sulfur or a sulfur-containing compound vulcanizing agent or vulcanizing aid, and various compounding agents required in terms of vulcanization and physical properties, and kneading the resulting mixture by any kneading means using an open roll, a kneader, or the like. Here, the sulfur-based vulcanizing agent is generally used at a ratio of 0.1 to 2.0 parts by weight based on 100 parts by weight of acrylic rubber. As the sulfur-containing compound (sulfur-donating compound), 2,4,6-trimercaptos-triazine, 4,4'-dithiomorpholine, tetramethylthiuram disulfide, tetraethylthiuram disulfide, tetrabutylthiuram disulfide, 2-mercaptoimidazoline, polymeric polysulfide, etc. are used The prepared composition is subjected to vulcanization molding by heat pressing at about 150 to 200° C. for about 2 to 30 minutes, optionally followed by oven vulcanization (secondary vulcanization) at about 170 to 230° C. for about 9 to 22 hours.

EXAMPLES

The following describes the present invention with reference to Examples.

Example 1

| | |
|---|---|
| Acrylic rubber (NOXTITE PA-404N, Tg: −42° C.) produced by Unimatec Co., Ltd.) | 100 parts by weight |
| Carbon black (#35G, produced by Asahi Carbon Co., Ltd. | 80 parts by weight |
| Silica (Aerosil 200, produced by Japan Aerosil Co., Ltd.) | 5 parts by weight |
| Graphite (Graphite A-0, produced by Nichiden Carbon Co.) | 5 parts by weight |
| Metal soap (NS SOAP, produced by Kao Corporation) | 3 parts by weight |
| Metal soap (SK-1, produced by NOF Corporation) | 0.25 parts by weight |
| Sulfur (produced by Tsurumi Chemical Industry Co., Ltd.) | 0.3 part by weight |

The above components were kneaded using a pressure type kneader, and the kneaded product (composition) was vulcanized at 175° C. for 15 minutes.

The composition and vulcanizate were measured and evaluated for the following items.

Roll processability: When processing was performed using a roll having a roll diameter of 10 inches and a surface roughness Ra of 0.04 to 0.13, the resulting product with no operational problems was evaluated as ○, and the resulting product with operational problems was evaluated as ×.

Compression set: According to JIS K-6262 corresponding to ASTM D575-91 (150° C., 70 hours)

80% or less is desirable

Cold resistance (TR10 value): According to JIS K-6261 corresponding to ASTM D1329-16

−35° C. or lower is desirable

Adhesion: The acrylic rubber composition was placed on a metal ring and subjected to vulcanization molding. Then, the vulcanized rubber layer was removed, and the rubber remaining ratio of the product surface was determined.

A rubber remaining ratio of 90% or more is desirable.

Example 2

In Example 1, as the graphite, the same amount (5 parts by weight) of Graphite G-6S (produced by Chuetsu Graphite Co., Ltd.) was used.

Example 3

In Example 1, as the graphite, the same amount (5 parts by weight) of Graphite C-1 (produced by Nichiden Carbon Co., Ltd.) was used.

Example 4

In Example 1, the amount of graphite was changed to 10 parts by weight.

Example 5

In Example 1, the amount of graphite was changed to 15 parts by weight.

Example 6

In Example 4, the amount of silica was changed to 7.5 parts by weight.

Example 7

In Example 1, the amount of silica was changed to 10 parts by weight.

Example 8

In Example 5, the amount of silica was changed to 10 parts by weight.

Example 9

In Example 1, the amount of silica was changed to 12.5 parts by weight.

Comparative Example 1

In Example 1, as the acrylic rubber, the same amount (100 parts by weight) of NOXTITE 402K (produced by UNIMATEC Co., Ltd., Tg: −31° C.) was used.

Comparative Example 2

In Example 1, no graphite was used.

Comparative Example 3

In Example 1, the amount of graphite was changed to 20 parts by weight.

Comparative Example 4

In Example 1, no silica was used.

Comparative Example 5

In Example 5, no silica was used.

Comparative Example 6

In Example 7, no graphite was used.

Comparative Example 7

In Example 1, the amount of silica was changed to 15 parts by weight, and no graphite was used.

Comparative Example 8

In Example 1, the amount of graphite was changed to 2.5 parts by weight.

Comparative Example 9

In Example 9, the amount of graphite was changed to 17.5 parts by weight.

Table below shows the results obtained in the above Examples and Comparative Examples.

TABLE

| Example | Roll processability | Compression set (%) | TR10 value (° C.) | Rubber remaining ratio (%) |
|---|---|---|---|---|
| Example 1 | ◯ | 62 | −37 | 90 |
| Example 2 | ◯ | 62 | −37 | 90 |
| Example 3 | ◯ | 62 | −36 | 90 |
| Example 4 | ◯ | 70 | −37 | 90 |
| Example 5 | ◯ | 71 | −36 | 90 |
| Example 6 | ◯ | 75 | −36 | 90 |
| Example 7 | ◯ | 79 | −37 | 90 |
| Example 8 | ◯ | 80 | −37 | 90 |
| Example 9 | ◯ | 80 | −37 | 90 |
| Comparative Example 1 | X | 70 | −25 | 90 |
| Comparative Example 2 | X | 67 | −37 | 70 |
| Comparative Example 3 | ◯ | 81 | −37 | 90 |
| Comparative Example 4 | ◯ | 70 | −37 | 70 |
| Comparative Example 5 | ◯ | 71 | −36 | 70 |
| Comparative Example 6 | X | 79 | −36 | 90 |
| Comparative Example 7 | X | 87 | −37 | 90 |
| Comparative Example 8 | X | 66 | −38 | 70 |
| Comparative Example 9 | ◯ | 81 | −37 | 90 |

The invention claimed is:

1. An acrylic rubber composition comprising 5 to 12.5 parts by weight of silica and 5 to 15 parts by weight of graphite as fillers, based on 100 parts by weight of ultracold-resistant acrylic rubber having a glass transition point Tg of −42° C. or lower.

2. The acrylic rubber composition according to claim 1, wherein the ultracold-resistant acrylic rubber is a halogen-containing acrylic rubber.

3. The acrylic rubber composition according to claim 1, wherein 0.1 to 2.0 parts by weight of sulfur-based vulcanizing agent is further contained.

4. The acrylic rubber composition according to claim 3, which is used for vulcanization molding of bonded piston seals.

5. A bonded piston seal obtained by vulcanization molding of the acrylic rubber composition according to claim 4.

6. The acrylic rubber composition according to claim 2, wherein 0.1 to 2.0 parts by weight of sulfur-based vulcanizing agent is further contained.

7. The acrylic rubber composition according to claim 6, which is used for vulcanization molding of bonded piston seals.

8. A bonded piston seal obtained by vulcanization molding of the acrylic rubber composition according to claim 7.

* * * * *